US007534309B2

(12) United States Patent
Toyama et al.

(10) Patent No.: US 7,534,309 B2
(45) Date of Patent: May 19, 2009

(54) AQUEOUS ALUMINUM BRAZING COMPOSITION, ALUMINUM MATERIAL COATED WITH THE BRAZING COMPOSITION, BRAZING METHOD USING THE ALUMINUM MATERIAL, AND AUTOMOTIVE HEAT EXCHANGER MANUFACTURED BY USING THE BRAZING METHOD

(75) Inventors: Taketoshi Toyama, Kariya (JP); Ryoichi Sanada, Kariya (JP); Takashi Hatori, Kariya (JP); Yoshiharu Hasegawa, Kariya (JP); Yuji Hisatomi, Tokyo (JP); Ichiro Taninaka, Kakogawa (JP)

(73) Assignees: Sumitomo Light Metal Industries, Ltd., Tokyo (JP); Harima Chemicals, Inc., Kakogawa, Hyogo (JP)

( * ) Notice: Subject to any disclaimer, the term of this patent is extended or adjusted under 35 U.S.C. 154(b) by 234 days.

(21) Appl. No.: 10/517,291

(22) PCT Filed: Jun. 16, 2003

(86) PCT No.: PCT/JP03/07604

§ 371 (c)(1),
(2), (4) Date: Sep. 9, 2005

(87) PCT Pub. No.: WO03/106102

PCT Pub. Date: Dec. 24, 2003

(65) Prior Publication Data

US 2006/0102691 A1 May 18, 2006

(30) Foreign Application Priority Data

Jun. 17, 2002 (JP) ............................ 2002-175318

(51) Int. Cl.
*B23K 35/34* (2006.01)
*C08L 93/00* (2006.01)
*B23K 1/20* (2006.01)
*B23K 31/02* (2006.01)

(52) U.S. Cl. .......................... 148/24; 148/23; 106/240; 228/223; 228/207

(58) Field of Classification Search ................. 228/262, 228/262.31, 262.5, 207, 223; 106/240
See application file for complete search history.

(56) References Cited

U.S. PATENT DOCUMENTS 3,607,369 A * 9/1971 Batta .......................... 427/309

(Continued)

FOREIGN PATENT DOCUMENTS

JP H11-239867 A * 9/1999

(Continued)

*Primary Examiner*—Jerry Lorengo
*Assistant Examiner*—Noah S Wiese
(74) *Attorney, Agent, or Firm*—Flynn, Thiel, Boutell & Tanis, P.C.

(57) ABSTRACT

An aqueous aluminum brazing composition containing an organic binder and a zinc-based flux which prevents the precipitation of the zinc-based flux having a large specific gravity while securing an excellent brazeability. The thixotropic index of the brazing composition is adjusted to 1.01-1.20 by adding a (meth)acrylic acid/(meth)acrylate copolymer emulsion to the brazing composition as a precipitation inhibitor in an amount of 0.03-1.50 wt % of 100 wt % of the brazing composition. Since the (meth)acrylic acid/(meth)acrylate copolymer emulsion is used as the precipitation inhibitor in a specific amount instead of other types of compounds used for a powder-containing paint, such as ultrafine particle silica, poly(meth)acrylate, or polyvinyl alcohol, the precipitation of the zinc-based flux can be prevented without impairing the brazeability.

6 Claims, 1 Drawing Sheet

U.S. PATENT DOCUMENTS

| | | | | |
|---|---|---|---|---|
| 4,413,084 | A * | 11/1983 | Horvath | 524/315 |
| 5,297,721 | A * | 3/1994 | Schneider et al. | 228/180.1 |
| 5,450,666 | A * | 9/1995 | Conn et al. | 29/890.043 |
| 6,099,968 | A * | 8/2000 | Harakawa et al. | 428/414 |
| 6,234,381 | B1 * | 5/2001 | Hasegawa et al. | 228/223 |
| 6,548,460 | B1 * | 4/2003 | Higai et al. | 508/465 |
| 6,800,345 | B2 * | 10/2004 | Teshima et al. | 428/35.8 |
| 2002/0139277 | A1 * | 10/2002 | Ogata | 106/31.3 |

FOREIGN PATENT DOCUMENTS

| | | | |
|---|---|---|---|
| JP | H15-010964 | A * | 10/2003 |
| WO | WO 01/38040 | * | 5/2001 |

* cited by examiner

AQUEOUS ALUMINUM BRAZING COMPOSITION, ALUMINUM MATERIAL COATED WITH THE BRAZING COMPOSITION, BRAZING METHOD USING THE ALUMINUM MATERIAL, AND AUTOMOTIVE HEAT EXCHANGER MANUFACTURED BY USING THE BRAZING METHOD

TECHNICAL FIELD

The present invention relates to an aqueous aluminum brazing composition which contains a zinc-based flux capable of improving corrosion resistance by forming a zinc diffusion layer in the case of brazing an aluminum material coated with the brazing composition. The brazing composition of the present invention is capable of effectively preventing the precipitation of the zinc-based flux in the brazing composition while maintaining an excellent brazeability. The present invention also relates to an aluminum material coated with the brazing composition, a brazing method using the aluminum material, and an automotive heat exchanger manufactured by using the brazing method.

BACKGROUND ART

Conventionally, a reduction of the weight of an automotive aluminum heat exchanger has been demanded in order to improve the fuel efficiency of the engine. In order to deal with this demand, it is necessary to reduce the thickness of the constituent material for the heat exchanger, such as a tube. However, a reduction of the thickness of the material tends to cause the leakage of fluid (refrigerant) due to pitting corrosion of the aluminum material. Therefore, it is important to reduce the thickness of the material while securing its corrosion resistance.

In a conventional automotive heat exchanger, the corrosion resistance of the tube which makes up a refrigerant passage is improved by extruding an aluminum material to have a multi-cavity flat cross-sectional shape, and forming a zinc diffusion layer having a surface zinc concentration of 0.5% or more on the outer surface of the multi-cavity flat tube by spraying zinc. The basic principle of this corrosion prevention method is as follows. Specifically, since the natural potential of the zinc diffusion layer is less noble than that of the aluminum material which makes up the tube, the zinc diffusion layer preferentially (sacrificially) corrodes in comparison with the aluminum material, thereby effectively preventing the pitting corrosion of the tube made of aluminum.

However, in this corrosion prevention method, since zinc is caused to adhere to the outer surface of the tube by spraying, it is difficult to cause the zinc to uniformly adhere to the surface of the aluminum material. If the amount of zinc caused to adhere by spraying is reduced from the economical point of view, zinc may not be supplied to part of the surface of the aluminum material, whereby the occurrence of corrosion concentrates on the part in which zinc is not supplied.

If the amount of zinc caused to adhere to the surface of the aluminum material is increased in order to prevent the occurrence of the above problem without taking cost into consideration, a high concentration of zinc is present in a brazed section between the tube and a corrugated fin. This may cause the brazed section to selectively corrode, whereby the corrugated fin may be removed from the tube.

The applicant of the present invention has disclosed a brazing method in which a conventional anticorrosive flux such as potassium fluoroaluminate is applied to a tube by using an organic binder in which an oxirane group-containing resin and polyoxazoline are added to a methacrylate copolymer (Japanese Patent Application Laid-open No. 2000-687).

The applicant of the present invention has also disclosed a method of applying a mixture of an organic binder containing a methacrylate polymer or copolymer as a major component, an anticorrosive flux, and silicon or zinc powder to an aluminum-extruded multi-cavity flat tube for an automotive heat exchanger by using a roll transfer method (Japanese Patent Application Laid-open No. 11-239867).

The present inventors expected that zinc could be uniformly and economically supplied to the surface of the aluminum material by applying the above conventional technology to a tube for a heat exchanger, and applying zinc powder to the tube through an organic binder. The present inventors prepared a paint (brazing composition) by mixing an organic binder, an anticorrosive flux, and zinc powder by way of experiment, and attempted to apply the paint to the tube. However, since the viscosity of the paint was increased within several hours after preparation, the paint could not be stably applied to the tube.

This phenomenon also occurs in a paint which does not contain an anticorrosive flux. Therefore, it is estimated that the viscosity of the paint is increased due to a chemical reaction between the organic binder and the zinc powder.

In more detail, it is estimated that a complexation reaction occurs between a carboxyl group in the organic binder and a zinc ion formed by hydrolysis of the zinc powder, and the organic binder forms a three-dimensional structure having the zinc ion as a nucleus, whereby the viscosity of the paint is increased. The carboxyl group in the organic binder is a substituent necessary for making the binder water-soluble taking recent environmental protection into consideration, and cannot be removed from the binder.

An increase in viscosity may be prevented by inhibiting formation of the zinc ion by using a zinc fluoride, which is a metal compound more stable than the zinc powder (powder of element zinc), instead of the zinc powder. Published Japanese Translation of PCT International Publication for Patent Application No. 2002-507488 discloses an alkaline metal salt of a fluorozincate, such as $KZnF_3$, as a specific example of the zinc fluoride. A fluoride has a low corrosiveness to a metal and has an effect as the flux.

The present inventors prepared a paint by mixing the above aqueous organic binder, potassium fluoroaluminate (flux), and $KZnF_3$. As a result, the increase in viscosity of the paint was reduced in comparison with the case of using zinc powder. However, the viscosity of the paint was considerably increased within about one day after preparation. It is estimated that the increase in viscosity is caused by the formation of $Zn^{2+}$ due to hydrolysis of part of the $KZnF_3$. Therefore, although the paint can be applied immediately after its preparation, there still remains a great degree of limitation from the industrial point of view.

International Patent Publication No. WO01/38040A1 discloses an aluminum brazing composition which includes $KZnF_3$ (zinc fluoride), a methacrylate homopolymer or copolymer, and an organic solvent such as xylene, and a brazing method using the same. This application suggests the use of a methacrylate homopolymer which does not contain a carboxyl group as a binder, for example. However, since the glass transition temperature of a homopolymer tends to be increased as the number of carbon atoms is decreased, the brazing composition may be removed from the aluminum material or cracks may occur on the surface of the brazing composition. Moreover, the use of toxic organic solvents has been limited from the viewpoint of environmental protection and safety in recent years. In particular, the use of aromatic solvents such as xylene gives rise to considerable problems.

The present inventors have conducted extensive studies to solve the problems relating to the interaction between the zinc ion and the carboxyl group in the organic binder based on the above knowledge. As a result, the present inventors have proposed an aluminum brazing method capable of controlling the reactivity of the carboxyl group in the organic binder by adding a specific compound such as a tertiary amino ethanol, such as dimethylamino ethanol or diethylamino ethanol, or a secondary amino alcohol, such as methylamino ethanol or ethylamino ethanol, as a reaction inhibitor (Japanese Patent Application No. 2001-193372).

Since the nitrogen atom in the amino alcohol has an unpaired electron, the amino alcohol basically functions to preferentially react with a proton-dissociated carboxyl group in the organic binder, whereby a reaction between the zinc ion formed by hydrolysis and the organic binder can be inhibited.

Therefore, an aluminum brazing composition containing an amino alcohol together with the zinc-based flux ($KZnF_3$) improves the corrosion resistance by a sacrificial corrosion effect of a zinc diffusion layer, and inhibits a reaction between the organic binder and the zinc ion by the effect of the amino alcohol, whereby an increase in viscosity of the brazing composition can be prevented.

However, since the specific gravity of $KZnF_3$ in the brazing composition is extremely large, $KZnF_3$ precipitates within several hours after preparation of a paint. This not only makes it necessary to stir the paint at the time of application, but also causes the paint to be solidified at the bottom of the container through the binder during storage. This precipitation phenomenon also occurs in a relatively short period of time until the paint is applied to the aluminum material. Therefore, a difference in concentration is produced in the paint, whereby the paint cannot be uniformly applied.

DISCLOSURE OF THE INVENTION

A technical object of the present invention is to provide an aluminum brazing composition containing an organic binder and a zinc-based flux which improves the corrosion resistance after brazing, and to prevent precipitation of the zinc-based flux having a large specific gravity while securing an excellent brazeability.

It is known in the art that various types of precipitation inhibitors are added to a powder-containing paint in order to prevent the precipitation of the powder. The present inventors had an idea of using a precipitation inhibitor in a paint containing $KZnF_3$ as a measure to prevent the occurrence of a difference in concentration in the paint due to the precipitation of $KZnF_3$ during storage or application.

The present inventors have added various types of precipitation inhibitors to a paint containing $KZnF_3$ (brazing composition) based on this idea and examined the degree of precipitation of $KZnF_3$. As a result, the present inventors have found that the precipitation of $KZnF_3$ can be effectively prevented while providing an excellent flowability to the paint only in the case where the thixotropic index of the paint is in a specific range. The present inventors have also found that it is important to select the type of the precipitation inhibitor, and the excellent brazeability can be secured only in the case of using a (meth)acrylic acid/(meth)acrylate copolymer emulsion, while many other types of precipitation inhibitors cause brazing failure and a decrease in corrosion resistance after brazing. These findings have led to the completion of the present invention.

The present invention provides the following aluminum brazing composition capable of achieving the above technical object.

An aqueous aluminum brazing composition which comprises a zinc-based flux, an organic binder, and a (meth)acrylic acid/(meth)acrylate copolymer emulsion as a precipitation inhibitor in an amount of 0.03-1.50 wt % of 100 wt % of the brazing composition, the brazing composition having a thixotropic index (TI) calculated by dividing a logarithm of the viscosity of the brazing composition measured at 25° C. and 10 rpm by a logarithm of viscosity of the brazing composition measured at 25° C. and 100 rpm by using an EH-type viscometer of 1.01-1.20 (first invention).

In the brazing composition according to the first invention, the zinc-based flux is a K—Zn—F-type zinc fluoride (second invention).

The brazing composition according to the first or second invention, further comprising metal silicon powder as a brazing filler metal (third invention).

The brazing composition according to any of the first to third inventions, further comprising a reaction inhibitor which inhibits a reaction between zinc and a carboxyl group in the organic binder or the precipitation inhibitor (fourth invention).

In the brazing composition according to the fourth invention, the reaction inhibitor is an amino alcohol having a boiling point of 120-200° C. (fifth invention).

The present invention provides the following aluminum material coated with the above brazing composition.

An aluminum material coated with a brazing composition which is produced by applying the brazing composition according to any of the first to fifth inventions to the aluminum material and drying the brazing composition, thereby causing a dried residual component in the brazing composition to adhere to a surface of the aluminum material (sixth invention).

In the aluminum material according to the sixth invention, an average thickness and a maximum thickness of a film of the brazing composition are respectively 2-15 μm and 30 μm or less (seventh invention).

In the aluminum material according to the sixth or seventh invention, an average particle diameter of the zinc-based flux is 30 μm or less (eighth invention).

A brazing method using the aluminum material according to the present invention comprises assembling the aluminum material coated with the brazing composition according to any of the sixth to eighth inventions into a specific structure, and heating the structure to a brazing temperature to form a zinc diffusion layer on the surface of the aluminum material (ninth invention).

An automotive heat exchanger according to the present invention is manufactured by using the brazing method according to the ninth invention (tenth invention).

BEST MODE FOR CARRYING OUT THE INVENTION

Figure 1:
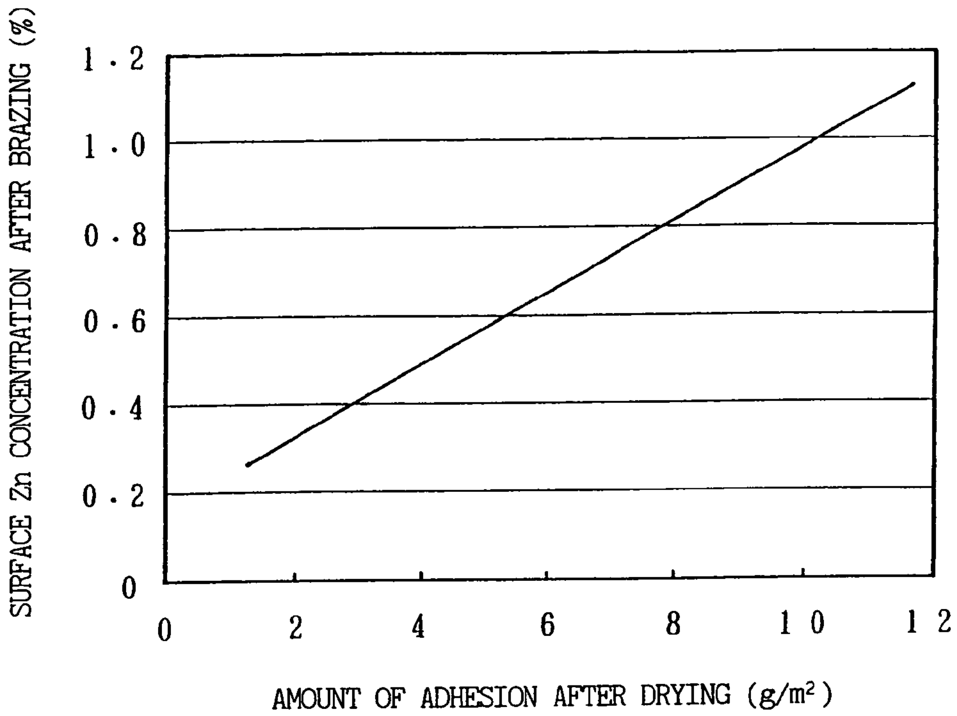
FIG. 1 is a graph showing the relation between the amount of a brazing composition adhering to an aluminum material after drying and the zinc concentration on the surface of the aluminum material after brazing.

A first feature of the present invention is an aqueous aluminum brazing composition comprising a zinc-based flux which improves the corrosion resistance and an organic binder, of which the thixotropic index (TI) is adjusted to a specific suitable range by adding a (meth)acrylic acid/(meth) acrylate copolymer emulsion to the brazing composition as a precipitation inhibitor in a specific amount. A second feature of the present invention is an aluminum material produced by applying the aqueous brazing composition to the aluminum material and drying the brazing composition. A third feature of the present invention is an aluminum brazing method which comprises heating the aluminum material coated with the brazing composition to form a zinc diffusion layer on the surface of the aluminum material, thereby improving the corrosion resistance. A fourth feature of the present invention is an automotive heat exchanger manufactured by using the aluminum brazing method.

The aqueous aluminum brazing composition of the present invention comprises a zinc-based flux, an organic binder, and a precipitation inhibitor as essential components.

The zinc-based flux forms a zinc diffusion layer on the surface of the aluminum material by the function of the zinc component to provide a sacrificial corrosion effect. The zinc-based flux reduces and removes an oxide film formed on the surface of the aluminum material to promote the formation of a eutectic alloy of aluminum and a brazing filler metal.

As defined in the second invention, the zinc-based flux is substantially a K—Zn—F-type zinc fluoride. The zinc fluoride has advantages such as the capability of preventing the formation of zinc ions in comparison with zinc element powder, the capability of functioning as a flux by the action of the fluoride, and having a small degree of corrosiveness to a metal.

In more detail, the zinc fluoride is a potassium fluorozincate such as $KZnF_3$. The ratio of each constituent element of $KZnF_3$ is preferably $KF/ZnF_2$=45/55 to 50/50 (wt %) The potassium salt portion may be replaced by another alkaline metal salt such as Cs or Rb depending on the purpose of use.

The zinc-based flux may be used individually. However, brazing is not affected if part of the zinc-based flux is replaced by a conventional anticorrosive flux (Nocolok flux) or the like. As examples of the anticorrosive flux, $KAlF_4$, a mixture of $KAlF_4$ and $K_3AlF_6$ ($KAlF_4$:$K_3AlF_6$=90:10 in molar ratio), $K_2AlF_5$, and the like can be given.

In addition to the anticorrosive flux, part of the zinc-based flux may be replaced by a fluoride-based flux such as CsF, RbF, LiF, NaF, or $CaF_2$, or a flux containing the fluoride flux as a major component.

The organic binder is substantially a (meth)acrylate polymer. A methacrylate polymer is preferable to an acrylate polymer since the methacrylate polymer is volatilized during brazing and leaves no carbide residue. The methacrylate polymer is a methacrylate polymer or a copolymer of two or more methacrylates. As examples of methacrylates, methyl methacrylate, ethyl methacrylate, propyl methacrylate, 2-methylpropyl methacrylate, n-butyl methacrylate, t-butyl methacrylate, 2-ethylhexyl methacrylate, octyl methacrylate, isodecyl methacrylate, lauryl methacrylate, tridecyl methacrylate, stearyl methacrylate, cyclohexyl methacrylate, benzyl methacrylate, diethylaminoethyl methacrylate, t-butylaminoethyl methacrylate, glycidyl methacrylate, tetrahydrofurfuryl methacrylate, and the like can be given.

The methacrylate copolymer may be a copolymer including the methacrylate and at least one monomer copolymerizable with the methacrylate such as a carboxyl group-containing monomer such as acrylic acid, methacrylic acid, maleic acid, and itaconic acid. The methacrylate copolymer may further include at least one of the following monomers (a) to (c) in addition to the above monomers.

$$CH_2{=}C(CH_3)COO(CH_2)_nOH \qquad (a)$$

wherein n is an integer of 2-4.

$$CH_2{=}C(CH_3)COO(C_2H_4O)_nH \qquad (b)$$

wherein n is an integer of 2-12.

$$CH_2{=}C(CH_3)COO(C_3H_6O)_nH \qquad (c)$$

wherein n is an integer of 2-12.

The organic binder is generally prepared by solution polymerization using a hydrophilic solvent such as isopropyl alcohol (IPA), 3-methoxy-3-methyl-1-butanol, n-propanol, ethylene glycol monoethyl ether, diethylene glycol monoethyl ether, triethylene glycol monoethyl ether, ethylene glycol monobutyl ether, or propylene glycol monoethyl ether.

The aqueous aluminum brazing composition of the present invention is prepared by saponifying the organic binder with an amino alcohol, amine, ammonia, or the like, optionally removing a part of the solvent and adding water to obtain an aqueous solution of the organic binder, and adding the zinc-based flux to the aqueous solution of the organic binder.

The TI of the aqueous aluminum brazing composition of the present invention is adjusted to 1.01-1.20 by the addition of a specific precipitation inhibitor in a specific amount. The TI used in the present invention is defined as a value calculated by dividing the logarithm of the viscosity of the brazing composition measured at 25° C. at 10 rpm by the logarithm of the viscosity of the brazing composition measured at 25° C. at 100 rpm by using an EH-type viscometer.

As examples of precipitation inhibitors for a powder-containing paint, inorganic precipitation inhibitors such as ultrafine particle silica and magnesium aluminum silicate, organic precipitation inhibitors such as poly(sodium (meth) acrylate), polyvinylalcohol, polyethylene oxide, and urethane modified polyether, and the like are known.

However, although brazing can be carried out by using a system to which an inorganic precipitation inhibitor such as ultrafine particle silica is added, inorganic substances originating from the precipitation inhibitor locally adhere to the aluminum material after brazing, whereby the corrosion resistance is significantly decreased in the area in which the inorganic substances adhere to the aluminum material. Moreover, since the organic precipitation inhibitors generally produce a carbide during brazing, the joining strength of the brazed section decreases.

However, only in the case where a (meth)acrylic acid/(meth)acrylate copolymer emulsion is added to the brazing composition, a carbide is not produced and excellent brazeability can be secured.

Specifically, the specific precipitation inhibitor in the present invention is a (meth)acrylic acid/(meth)acrylate copolymer emulsion. The (meth)acrylic acid includes acrylic acid and methacrylic acid.

The (meth)acrylic acid/(meth)acrylate copolymer is a copolymer which includes (meth)acrylic acid and (meth) acrylate as an indispensable monomer composition, and excludes a (meth)acrylic acid homopolymer and (meth)acrylate homopolymer. However, the (meth)acrylic acid/(meth) acrylate copolymer may be a copolymer which includes a monomer copolymerizable with the (meth)acrylic acid monomer or (meth)acrylate monomer in addition to the (meth)acrylic acid monomer or (meth)acrylate monomer. The (meth)acrylic acid/(meth)acrylate copolymer is added to the brazing composition in the form of an aqueous emulsion.

As commercially available products of the (meth)acrylic acid/(meth)acrylate copolymer emulsion, Latekoll D (manufactured by BASF Japan Ltd.), Primal ASE-60 and 95 (manufactured by Rohm and Haas Japan KK), and the like can be given.

There is a case in which it is common in the composition of the precipitation inhibitor and the organic binder. However, it is necessary that the weight average molecular weight of the copolymer which makes up the precipitation inhibitor is greater by more than one digit over that of the organic binder, as described in the examples given below. This large difference in the weight average molecular weight is the reason why suitable thixotropic viscosity is provided to the brazing composition.

In the brazing composition of the present invention, since the content of the (meth)acrylic acid/(meth)acrylate copolymer emulsion has a close relevance to the TI of the brazing composition, the copolymer emulsion must be added to the brazing composition in an amount of 0.03-1.50 wt %, preferably 0.05-1.50 wt %, and still more preferably 0.1-1.50 wt % of 100 wt % of the brazing composition.

In more detail, the TI of the aluminum brazing composition containing zinc-based flux ($KZnF_3$) is adjusted to 1.01-1.20, and preferably 1.05-1.20 in order to prevent the precipitation of the zinc-based flux ($KZnF_3$). If the TI is smaller than 1.01, the precipitation of the zinc-based flux having a large specific gravity cannot be sufficiently prevented. If the TI exceeds 1.20, the thixotropic viscosity of the brazing composition is excessively increased. This decreases the flowability of the paint, whereby various problems occur during use. The TI of the brazing composition is specified by the content of the precipitation inhibitor. If the content of the precipitation inhibitor is less than 0.03 wt %, a target TI cannot be obtained. If the content of the precipitation inhibitor exceeds 1.50 wt %, a carbide is produced, even in a small amount. Therefore, the content of the precipitation inhibitor is adjusted to 0.03-1.50 wt % in order to control the TI of the brazing composition in the range of 1.01-1.20 while securing an excellent brazeability.

The aqueous aluminum brazing composition of the present invention may further comprise metal silicon powder as a brazing filler metal in addition to the flux, as defined in the third invention.

Si reacts with the aluminum material during brazing to form a eutectic alloy having a melting point lower than that of aluminum. The aluminum materials are brazed smoothly by this eutectic composition. Therefore, if the brazing composition containing Si powder is applied to the aluminum material, a plurality of aluminum materials can be brazed without cladding a brazing filler metal on the aluminum material to be brazed. This enables the aluminum material to be formed as an inexpensive aluminum bare material, whereby it is advantageous in reducing cost. In the case of manufacturing an automotive heat exchanger, this method makes it unnecessary to use a brazing filler metal which is conventionally clad on a corrugated fin.

An Si—Al alloy, copper, germanium, and the like may be mixed with the brazing composition as a brazing filler metal in addition to metal silicon.

As described above, a carboxyl group is present in the molecule of the organic binder in the aqueous aluminum brazing composition in order to secure water solubility.

Therefore, a reaction between the carboxyl group in the organic binder and the zinc-based flux can be inhibited by adding the reaction inhibitor to the aqueous aluminum brazing composition of the present invention as defined in the fourth invention (in the present invention, since a carboxyl group is also included in the precipitation inhibitor, a reaction between the carboxyl group in the precipitation inhibitor and the zinc-based flux can be inhibited). As disclosed in the technology proposed by the applicant of the present invention, an increase in viscosity occurring during the storage or application of the brazing composition can be prevented by adding the reaction inhibitor, and a reduction of cost and improvement of applicability can be achieved.

As examples of reaction inhibitors, tertiary amino alcohols such as dimethylamino ethanol and diethylamino ethanol, secondary amino alcohols such as methylamino ethanol, ethylamino ethanol, and isopropylamino ethanol, and the like can be given.

The principle of reaction inhibition of the amino alcohol is estimated as follows. Since the nitrogen atom in the molecule of the amino alcohol has a lone electron pair, the amino alcohol nucleophilically attacks a proton-dissociated carboxyl group to prevent ionized zinc ($Zn^{2+}$) from reacting with the carboxyl group.

The reaction inhibitor is preferably added to the brazing composition in an amount of about 0.2-2 wt % of 100 wt % of the brazing composition. If the amount of the reaction inhibitor is greater than 2 wt %, amine odors characteristic of the amino alcohol are increased. If the amount of the reaction inhibitor is less than 0.2 wt %, the reaction inhibition effect is decreased.

As the amino alcohol used as the reaction inhibitor, an amino alcohol having a boiling point of preferably 120-200° C., and more preferably 120-180° C. is used, as defined in the fifth invention. If the boiling point of the amino alcohol is less than 120° C., amine odors characteristic of the amino alcohol are increased. If the boiling point of the amino alcohol exceeds 200° C., the reaction inhibitor may not be fully volatilized in the drying step after applying the brazing composition, although the amine odors are reduced.

As examples of the amino alcohols having a boiling point of 120-200° C., the secondary and tertiary amino alcohols illustrated above can be given.

The sixth invention is an aluminum material coated with the above brazing composition. For example, the aluminum material is obtained by applying the brazing composition to an aluminum material by using a conventional applicator, and fully volatilizing volatile components in the brazing composition, thereby causing nonvolatile components in the brazing composition to be dried and to adhere to the aluminum material.

In the case of applying the brazing composition to the aluminum material, brazeability is influenced to a large extent by the applied form of the brazing composition and properties of the zinc-based flux in the composition.

Specifically, in the case of manufacturing a heat exchanger by stacking several tens of stages of aluminum tubes coated with the brazing composition depending on the actual scale of the product, brazeability and corrosion resistance of the aluminum materials are significantly influenced by the state of the zinc-based flux powder in the brazing composition and the quality of a film applied to the tube.

The present inventors have examined the reaction behavior of the zinc fluoride during heating for brazing. The zinc fluoride and the aluminum tube which is in contact with the zinc fluoride are reacted at about 550° C., whereby K—Al—F compounds and zinc are formed. In the case where the average thickness of the film of the brazing composition applied to the aluminum material is 2-15 μm, and preferably 2-10 μm, only a flux residue which was melted, solidified, and crystallized was observed on the surface of the aluminum material, and the zinc adhering to the surface of the aluminum material was sufficiently diffused. As a result, the fin of the heat exchanger was joined to the aluminum material in a good state.

If the average thickness of the film exceeds 15 μm, an unmelted flux residue in the form of powder partly remains on the surface of the aluminum tube, whereby contact between the tube and the fin is impaired. Moreover, since the amount of zinc diffusing on the aluminum tube is not sufficiently increased although a large amount of zinc adheres, the joining rate of the fin is significantly decreased. If the average thickness of the film is less than 2 μm, the amount of zinc diffusing on the tube is too small since the amount of adhesion is too small, whereby its corrosion resistance is decreased.

If the maximum thickness of the film partly exceeds 30 μm, the joining rate of the aluminum material with the fin after brazing is decreased. Since the concentration of zinc diffused on the tube is increased only in the area in which the maximum thickness of the film exceeds 30 μm, this area preferentially corrodes, whereby its corrosion resistance is decreased.

As described above, in the case of applying the brazing composition to the aluminum material, the joining rate by brazing is decreased if the average thickness and the maximum thickness of the film are excessively increased. If the average thickness of the film is too small, its corrosion resistance is decreased. Therefore, it is preferable that the average thickness and the maximum thickness of the film be 2-15 μm and 30 μm or less, respectively, as defined in the seventh invention. The average thickness and the maximum thickness of the film are still more preferably 3-10 μm and 20 μm or less, respectively.

The thickness of the film of the brazing composition when applying the brazing composition to the aluminum material is described above. In the case of using the brazing composition containing a zinc-based flux, it is necessary to adjust the zinc concentration on the surface of the aluminum to 0.5% or more in order to obtain sufficient corrosion resistance after brazing.

The present inventors have examined the relation between the amount of adhesion of the component of the brazing composition containing $KZnF_3$ after drying and the surface zinc concentration after brazing. As a result, the correlation shown in FIG. 1 was obtained. As shown in FIG. 1, in the case of applying the brazing composition to the aluminum material, the amount of adhesion must be 4 g/m or more in order to secure a surface zinc concentration of 0.5% or more after brazing. The amount of adhesion is preferably 8±1 g/$m^2$ or more in order to further improve its corrosion resistance. Therefore, the amount of adhesion at the surface of the aluminum per unit area is important in addition to the thickness of the film in order to secure excellent brazeability.

In the case of applying the brazing composition to the aluminum material, if the average particle diameter of the zinc-based flux powder in the brazing composition is 30 μm or less, only a flux residue which was melted, solidified, and crystallized was observed on the surface of the aluminum material, and the zinc applied to the surface of the aluminum material was sufficiently diffused. As a result, the joining rate of the fin was increased. If the average particle diameter of the zinc-based flux powder exceeds 30 μm, an unmelted flux residue in the form of powder partly remains on the surface of the aluminum tube after brazing. The flux residue prevents the tube from coming in contact with the fin, whereby the joining rate of the fin was significantly decreased.

Therefore, the average particle diameter of the zinc-based flux in the brazing composition is preferably 30 μm or less, as defined in the eighth invention.

A mechanism by which the characteristics are decreased in the brazing step is estimated as follows. Specifically, a reaction occurs in the contact area between the aluminum base metal and the flux and progresses gradually and continuously, whereby the joining rate is decreased due to the presence of an unreacted area.

The ninth invention is an aluminum brazing method which comprises assembling an aluminum material coated with the brazing composition into a specific structure, and heating the structure to the brazing temperature to form a zinc diffusion layer on the surface of the aluminum material, thereby improving the corrosion resistance of the aluminum material by using the sacrificial corrosion effect of zinc.

The brazing method according to the ninth invention may be applied for manufacturing an arbitrary aluminum product. The tenth invention is a specific example of the aluminum product, which is an automotive heat exchanger (for an air conditioner, for example) manufactured by using the brazing method.

In the present invention, the term “aluminum” includes aluminum alloys.

A synthesis example of an organic binder, a synthesis example of a precipitation inhibitor, and an example of an aqueous aluminum brazing composition containing these additives are described below. Test examples of the TI, precipitation prevention properties, and brazeability of the brazing composition are described thereafter.

Then, test examples of an increase in viscosity and an odor level accompanied by changes in the content of the reaction inhibitor in the brazing composition are described.

Test examples of brazeability, fin joining rate, and maximum corrosion depth accompanied by changes in the thickness of the film of the brazing composition applied to the aluminum material and changes in the average particle diameter of a zinc-based flux in the composition are described thereafter.

In the following synthesis examples, examples, and test examples, “part” and “%” refer to “part by weight” and “wt %” unless otherwise indicated.

The present invention is not limited to the following examples and test examples. Various modifications and variations are possible without departing from the spirit and scope of the present invention.

<Synthesis Example of an Organic Binder>

A reaction vessel equipped with a stirrer, condenser, dropping funnel, and nitrogen inlet was charged with 600 parts of isopropyl alcohol. The mixture was heated in a nitrogen stream until the temperature in the system was increased to 80° C. A mixed solution of 100 parts of methyl methacrylate, 275 parts of isobutyl methacrylate, 25 parts of methacrylic acid, and 4 parts of benzoyl peroxide was added dropwise to the system in about three hours. The mixture was polymerized at 80° C. for 10 hours to obtain a resin solution with an acid value of about 40 after drying and a nonvolatile content of 40%.

A reaction vessel equipped with a stirrer, evaporator, and nitrogen inlet was charged with 100 parts of the above resin solution, 50 parts of ion-exchanged water, 150 parts of 3-methoxy-3-methyl-1-butanol, and 2.5 parts of N,N-dimethylamino ethanol. The mixture was heated in a nitrogen stream until the system was refluxed to obtain a saponified solution of the above resin. 60 parts of isopropyl alcohol in the system was removed by using the evaporator. A small amount of ion-exchanged water was added at the time of the completion of the reaction to obtain a water soluble organic binder with a nonvolatile content of 15%. The weight average molecular weight of the copolymer in the resin was 88,900.

<Synthesis Example of a Precipitation Inhibitor>

A reaction vessel equipped with a stirrer, condenser, dropping funnel, and nitrogen inlet was charged with 50 parts of ion-exchanged water and 0.1 part of sodium bisulfite. The mixture was heated in a nitrogen stream until the temperature in the system was increased to 85° C. Then, 15 parts of methacrylic acid, 15 parts of ethyl methacrylate, 20 parts of ion-exchanged water, 1 part of polyethylene glycol nonyl phenyl ether, 1 part of ammonium polyethylene glycol oleyl ether sulfonate, and 0.5 part of ammonium persulfate were pre-emulsified for 10 minutes by using a homogenizer. The pre-emulsified product was added dropwise to the system in four hours. The mixture was polymerized at 85° C. for four hours to obtain a precipitation inhibitor emulsion of a methacrylic acid/ethyl methacrylate copolymer having a pH of 2.1 and a weight average molecular weight of 2,960,000.

A manufacturing example of an aqueous aluminum brazing composition containing the above organic binder and precipitation inhibitor is described below.

<Manufacturing Example of an Aqueous Aluminum Brazing Composition>

As shown in Table 1, the precipitation inhibitor consisting of the methacrylic acid/methacrylate copolymer emulsion obtained in the synthesis example was mixed with the organic binder obtained in the synthesis example. After the addition of a reaction inhibitor, the mixture was fully stirred and mixed. After the addition of the flux, the mixture was stirred and mixed. An appropriate amount of 3-methoxy-3-methyl-1-butanol was added to the mixture to prepare the brazing compositions of Examples 1-12 having a nonvolatile content of 50%. In Examples 1-12, the content of the precipitation inhibitor and the type and content of the reaction inhibitor were changed. The amino alcohol and $KZnF_3$ were respectively used as the reaction inhibitor and the flux (brazing compositions of Examples 11 and 12 did not contain the reaction inhibitor).

The brazing compositions of Examples 1-12 used only the flux and did not contain a brazing filler metal. The brazing composition of Example 13 is an example in which both a brazing filler metal and flux ($KZnF_3$) were used based on Example 7. In Example 13, the ratio of the flux to the brazing filler metal was adjusted to $KZnF_3$:Si=2:1. The other conditions were the same as in Example 7.

As shown in Table 2, the organic binder obtained in the synthesis example, flux ($KZnF_3$), another type of precipitation inhibitor or the precipitation inhibitor in an amount outside the specific range, and the reaction inhibitor were mixed to prepare brazing compositions of Comparative Examples 1-9. Comparative Examples 1 and 2 are control examples in which the brazing compositions did not contain a precipitation inhibitor. Comparative Examples 3 and 4 are examples in which the precipitation inhibitor was added to the brazing composition in an excess amount of 2.0-5.0%. Comparative Examples 5-9 are examples in which a conventional compound used for a powder-containing paint was used as the precipitation inhibitor instead of the methacrylic acid/methacrylate copolymer emulsion.

In Examples 1-13 and Comparative Examples 1-9, the amount of the flux and the brazing filler metal in the brazing composition was adjusted to be 90% for 10% of the nonvolatile content of the organic binder.

TABLE 1

| | | | Precipitation inhibitor | | Reaction inhibitor | | |
|---|---|---|---|---|---|---|---|
| | | Organic binder | Type | Amount (%) | Type | Amount (%) | Flux |
| Example | 1 | Organic | Methacrylic acid/ | 0.03 | Dimethylamino ethanol | 1.0 | $KZnF_3$ |
| | 2 | binder of | methacrylate | 0.1 | | 1.0 | |
| | 3 | synthesis | copolymer emulsion | 0.5 | | 0.2 | |
| | 4 | example | | 0.5 | | 1.0 | |
| | 5 | | | 0.5 | | 3.0 | |
| | 6 | | | 0.5 | Isopropylamino ethanol | 0.2 | |
| | 7 | | | 0.5 | | 1.0 | |
| | 8 | | | 0.5 | | 3.0 | |
| | 9 | | | 1.0 | Dimethylamino ethanol | 1.0 | |
| | 10 | | | 1.5 | | 1.0 | |
| | 11 | | | 0.5 | — | — | |
| | 12 | | | 1.0 | — | — | |
| | 13 | | | 0.5 | Isopropylamino ethanol | 1.0 | |

Note:
A brazing filler metal was added to the flux in Example 13.

TABLE 2

| | | | Precipitation inhibitor | | Reaction inhibitor | | |
|---|---|---|---|---|---|---|---|
| | | Organic binder | Type | Amount (%) | Type | Amount (%) | Flux |
| Comparative Example | 1 | Organic | — | — | Dimethylamino | 0.2 | $KZnF_3$ |
| | 2 | binder of | — | — | ethanol | 2.0 | |
| | 3 | synthesis | Methacrylic acid/methacrylate | 2.0 | | 1.0 | |
| | 4 | example | copolymer emulsion | 5.0 | | 1.0 | |
| | 5 | | Ultrafine particle silica | 1.0 | | 1.0 | |
| | 6 | | Poly(sodium acrylate) | 1.0 | | 1.0 | |
| | 7 | | Poly(sodium methacrylate) | 1.0 | | 1.0 | |

TABLE 2-continued

| Organic binder | Precipitation inhibitor Type | Amount (%) | Reaction inhibitor Type | Amount (%) | Flux |
|---|---|---|---|---|---|
| 8 | Polyvinyl alcohol | 1.0 | | 1.0 | |
| 9 | Polyethylene oxide | 1.0 | | 1.0 | |

The TI of the brazing compositions (paints) of Examples 1-13 and Comparative Examples 1-9 was calculated according to the definition in the present invention. Precipitation prevention properties of the paint and brazeability in the case of heating the paint applied to the aluminum material were evaluated.

<Evaluation Test Example of the Precipitation Prevention Properties and Brazeability of the Brazing Composition>

(1) Test Example of TI and Precipitation Prevention Properties

The viscosity of the paints of Examples 1-13 and Comparative Examples 1-9 immediately after preparation was measured at 25° C. and at 10 rpm and 100 rpm by using an EH-type viscometer (manufactured by Toki Sangyo Co., Ltd.). The TI was calculated according to the following equation (A).

$$TI = \log P / \log Q \quad (A)$$

P: Viscosity of the paint at 25° C. and 10 rpm

Q: Viscosity of the paint at 25° C. and 100 rpm

The paints were allowed to stand for one week. The precipitation prevention properties of the paint were evaluated by observing the degree of precipitation at the bottom of the container with the naked eye.

The evaluation criteria were as follows.

Excellent: No precipitate was observed or the paint became uniform by mildly stirring the paint.

Fair: The paint did not become uniform without using a mechanical dispersion device.

Bad: The flux was solidified at the bottom of the container.

(2) Test Example of Brazeability

Figure 2:
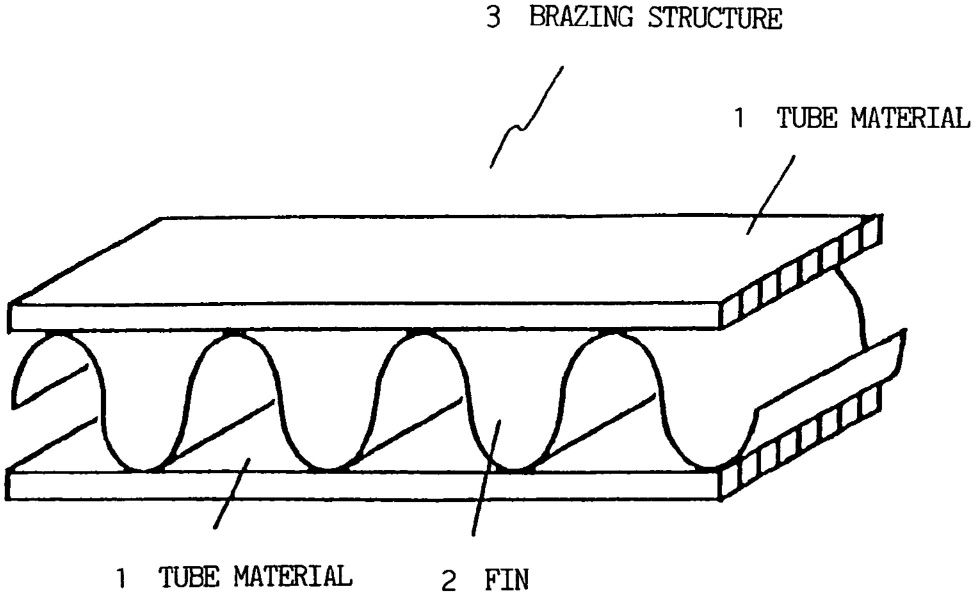
FIG. 2 is a schematic oblique view showing a brazing structure formed by assembling tube materials and a fin.

A brazing structure 3 shown in FIG. 2 was formed as follows. Each of the paints of Examples 1-12 and Comparative Examples 1-9 was applied to an aluminum alloy tube material 1 containing 0.4% of copper and 0.15% of manganese by using a roll coater. After the application, the paint was dried at 180° C. for one minute in a circulation oven. The amount of application was adjusted so that the weight of the adhering component after drying was 8±1 $g/m_2$ in order to secure excellent corrosion resistance.

In the case of using the paints of Examples 1-12 and Comparative Examples 1-9, which did not contain a brazing filler metal, a fin 2 consisting of a brazing sheet, in which an aluminum alloy containing 1.2% of manganese and 2.5% of zinc was clad with a silicon-aluminum alloy, was used. In the case of using the paint of Example 13 containing the brazing filler metal, a bare fin 2 made of an aluminum alloy containing 1.2% of manganese and 2.5% of zinc was used. The brazing structure 3 was manufactured by combining the fin 2 with the tube materials 1, as shown in FIG. 2.

The brazing structure 3 was brazed by heating the brazing structure 3 at 600° C. in a nitrogen atmosphere. Brazeability was evaluated by observing carbonization conditions of the binder and the state of the fillet at the joint section with the naked eye. The test results are shown in Table 3.

The evaluation criteria were as follows.

Excellent: No carbide was observed, and the state of the fillet was good.

Fair: The state of the fillet was good, but a carbide residue was observed.

Bad: A carbide was observed, and the fillet was small.

In Examples 1-13 in which the methacrylic acid/methacrylate copolymer emulsion was used as the precipitation inhibitor, the TI was within a suitable range of 1.01-1.20 and the precipitation prevention properties and brazeability were evaluated as excellent.

In Example 1, in which the content of the precipitation inhibitor was as small as 0.03%, the TI was 1.01. In Example 10, in which the content of the precipitation inhibitor was 1.50, the TI was 1.05. In Examples 1 and 10, the precipitation prevention properties and brazeability were evaluated as excellent. In Comparative Examples 1 and 2, in which the content of the precipitation inhibitor was 0% (control examples), the TI was 1.00 and the precipitation prevention properties were evaluated as bad. In Comparative Example 4, in which the content of the precipitation inhibitor was excessively high (5%), the TI was 1.00 and the precipitation prevention properties and brazeability were evaluated as bad. In Comparative Example 3, in which the content of the precipitation inhibitor was 2%, the TI was 1.01 and the precipitation prevention properties and brazeability were evaluated as fair. As described above, the performance was decreased in Comparative Examples 1-4. Specifically, the TI could not be adjusted within the suitable range if the content of the precipitation inhibitor was too low or too high, whereby the precipitation of the zinc-based flux could not be prevented. In the case where the content of the precipitation inhibitor was too high, the brazeability was adversely affected due to the formation of a carbide.

There is a case in which it is common on the composition of the methacrylic acid/methacrylate copolymer (that makes up the precipitation inhibitor) and the organic binder. In the case of using the methacrylic acid/methacrylate copolymer for the precipitation inhibitor, it should be added a little by the additives level. If the methacrylic acid/methacrylate copolymer is added in an excessive amount by the organic binder level, the precipitation prevention properties and brazeability were adversely affected as shown in Comparative Examples 3 and 4.

In Comparative Examples 5-9, in which compounds other than the methacrylic acid/methacrylate copolymer, such as ultrafine particle silica and a (meth)acrylate homopolymer, were used as the precipitation inhibitor, the brazaeability was evaluated as fair or bad, although the precipitation prevention properties were evaluated as excellent.

As is clear from the above results, it was confirmed that the methacrylic acid/methacrylate copolymer emulsion is remarkably effective as the precipitation inhibitor from the viewpoint of securing excellent precipitation prevention properties for the zinc-based flux and excellent brazeability for the aluminum material.

TABLE 3

| | | TI | Precipitation prevention properties | Brazeability |
|---|---|---|---|---|
| Example | 1 | 1.01 | Excellent | Excellent |
| | 2 | 1.08 | Excellent | Excellent |
| | 3 | 1.09 | Excellent | Excellent |
| | 4 | 1.07 | Excellent | Excellent |
| | 5 | 1.10 | Excellent | Excellent |
| | 6 | 1.09 | Excellent | Excellent |
| | 7 | 1.09 | Excellent | Excellent |
| | 8 | 1.09 | Excellent | Excellent |
| | 9 | 1.07 | Excellent | Excellent |
| | 10 | 1.05 | Excellent | Excellent |
| | 11 | 1.07 | Excellent | Excellent |
| | 12 | 1.05 | Excellent | Excellent |
| | 13 | 1.15 | Excellent | Excellent |
| Comparative Example | 1 | 1.00 | Bad | Excellent |
| | 2 | 1.00 | Bad | Excellent |
| | 3 | 1.00 | Fair | Fair |
| | 4 | 1.00 | Bad | Bad |
| | 5 | 1.12 | Excellent | Fair |
| | 6 | 1.08 | Excellent | Bad |
| | 7 | 1.10 | Excellent | Fair |
| | 8 | 1.15 | Excellent | Bad |
| | 9 | 1.63 | Excellent | Bad |

Tests were made on an increase in viscosity and the degree of odor of the brazing composition (paint) while changing the type and amount of the reaction inhibitor in the brazing composition as proposed in the conventional technology.

<Test Example of an Increase in the Viscosity of the Brazing Composition>

The viscosity of each of the paints of Examples 1-13 and Comparative Examples 1-9 was measured at 25° C. and 50 rpm by using an EH-type viscometer (manufactured by Toki Sangyo Co., Ltd.) immediately after the preparation and one week after the preparation. The viscosity increase rate (%) was calculated to evaluate an increase in the viscosity of the paints.

The evaluation criteria were as follows.

Excellent: The viscosity increase rate was 2% or less.

Fair: The viscosity increase rate was more than 2% but less than 10%.

Bad: The viscosity increase rate was 10% or more.

<Test Example of the Odor Level of the Brazing Composition>

Each of the paints prepared in Examples 1-13 and Comparative Examples 1-9 was placed in an airtight container and allowed to stand at 40° C. for one hour in a circulation oven. The lid of the container was immediately opened and an odor sensing test was carried out. The test results are shown in Table 4.

The evaluation criteria were as follows.

Excellent: The odor was in a tolerable range.

Bad: The odor was intolerable.

In Examples 2, 4-6, 7-10 and 13 and Comparative Examples 2-9, in which dimethylamino ethanol or isopropylamino ethanol was used as the reaction inhibitor while changing the amount thereof in the range of 1.0-3.0%, an increase in viscosity was evaluated as excellent. This shows that the reaction between the zinc component and the carboxyl group in the organic binder and the like can be inhibited favorably. In Examples 3 and 6 and Comparative Example 1, in which the content of the amino alcohol was as low as 0.2%, the increase in viscosity was evaluated as fair. This indicates that the effect of inhibiting the reaction was reduced. In Examples 11 and 12 in which the amino alcohol was not added, the increase in viscosity was evaluated as bad. In Examples 5 and 8, in which the content of the amino alcohol was as high as 3.0%, the paint had a strong odor (odor level was evaluated as bad).

Therefore, in the case of adding the amino alcohol to the brazing composition, the content of the amino alcohol must be within the suitable range in order to inhibit the reaction between the zinc component and the carboxyl group and to prevent occurrence of odors.

TABLE 4

| | | Increase in viscosity | Odor level |
|---|---|---|---|
| Example | 1 | Excellent | Excellent |
| | 2 | Excellent | Excellent |
| | 3 | Fair | Excellent |
| | 4 | Excellent | Excellent |
| | 5 | Excellent | Bad |
| | 6 | Fair | Excellent |
| | 7 | Excellent | Excellent |
| | 8 | Excellent | Bad |
| | 9 | Excellent | Excellent |
| | 10 | Excellent | Excellent |
| | 11 | Bad | Excellent |
| | 12 | Bad | Excellent |
| | 13 | Excellent | Excellent |
| Comparative Example | 1 | Fair | Excellent |
| | 2 | Excellent | Excellent |
| | 3 | Excellent | Excellent |
| | 4 | Excellent | Excellent |
| | 5 | Excellent | Excellent |
| | 6 | Excellent | Excellent |
| | 7 | Excellent | Excellent |
| | 8 | Excellent | Excellent |
| | 9 | Excellent | Excellent |

A test was made on the influence on brazeability of the aluminum material, fin joining rate, and maximum corrosion depth while changing the thickness of the film of the brazing composition and the particle diameter of the flux.

<Test Example of the Applied Form of the Brazing Composition>

In the applied form test example, conditions for the average thickness (μm) and the maximum thickness (μm) of the film of each of the brazing compositions obtained in Examples 1-13 and Comparative Examples 1-9, and the average particle diameters of the $KZnF_3$ flux were changed as shown in Tables 5 and 6. The brazing compositions of Examples 14-16 were prepared based on Example 7 and a brazing composition of Example 17 was prepared based on Example 2, while changing the average particle diameter of the flux and the average thickness and the maximum thickness of the film of the brazing composition, as shown in Tables 5 and 6.

The brazeability test in the applied form test example was substantially the same as the brazeability test for the precipitation inhibitor. An aluminum heat exchanger was assembled by stacking the fins 2 in 20 stages on the tubes 1 having a length of 200 mm at a fin pitch of 3 mm (see FIG. 2).

Brazeability was evaluated by observing the carbonization state of the organic binder and the state of the fillet at the joint section with the naked eye. The evaluation criteria ("excellent", "fair", and "bad") were the same as those in the brazeability test for the precipitation inhibitor.

In the test of the fin joining rate, the presence or absence of joining was observed with the naked eye by pressing a jig against the corrugated fin material after heating for brazing to calculate the joining rate (%) according to the following equation.

Joining rate=(number of unjoined fin crests/total number of corrugated crests)×100

A representative area was cut and buried in a resin to check whether or not the joint section buckled.

The evaluation criteria of the fin joining rate were as follows.

Excellent: The joining rate was 95% or more.

Bad: The joining rate was less than 95%.

In the corrosion test, a core processed by the same step as in the brazeability test was subjected to a SWAAT corrosion test (ASTM G85-85) for six weeks. The maximum pitting corrosion depth (mm) of the tube was measured after the corrosion test to evaluate the corrosion resistance of the aluminum material.

The evaluation criteria of corrosion resistance were as follows.

Excellent: The maximum pitting corrosion depth was less than 0.15 mm.

Bad: The maximum pitting corrosion depth was 0.15 mm or more.

The test results are shown in Tables 5 and 6.

In Comparative Example 2, since the average thickness of the film of the brazing composition applied to the aluminum material was as small as 1 μm, the maximum corrosion depth was 0.30 mm (evaluation was "bad"), whereby the corrosion resistance decreased. In Example 15, since the average film thickness was as large as 20 μm, the fin joining rate was 88.9% (evaluation was "bad").

In Example 17, since the maximum thickness of the film was as large as 35 μm, the fin joining rate was 93.5% and the maximum corrosion depth was 0.22 mm (joining rate and corrosion resistance were evaluated as "bad").

In Comparative Example 5, since the average particle diameter of the flux was as large as 36 μm, an unreacted powder residue remained, whereby the fin joining rate was decreased to 88.1% (evaluation was "bad").

On the other hand, in the examples in which the average thickness of the film of the brazing composition was 2-15 μm, the maximum thickness of the film was 30 μm or less, and the average particle diameter of the flux in the composition was 30 μm or less, brazeability, fin joining rate, and corrosion resistance were evaluated as excellent.

As described above, it was confirmed that it is important to control the average thickness and the maximum thickness of the film of the brazing composition and the average particle diameter of the flux in the composition within the above suitable range in order to improve the fin joining rate and corrosion resistance in addition to the brazeability.

TABLE 5

| | | Average particle diameter (μm) | Average film thickness (μm) | Maximum film thickness (μm) | Brazeability | Fin joining rate (%) | Maximum corrosion depth (mm) |
|---|---|---|---|---|---|---|---|
| Example | 1 | 12 | 4 | 18 | Excellent | 96.5 | 0.12 |
| | 2 | 11 | 4 | 20 | Excellent | 97.0 | 0.12 |
| | 3 | 30 | 5 | 25 | Excellent | 97.5 | 0.11 |
| | 4 | 16 | 2 | 28 | Excellent | 97.5 | 0.14 |
| | 5 | 12 | 3 | 16 | Excellent | 96.8 | 0.12 |
| | 6 | 10 | 4 | 18 | Excellent | 98.4 | 0.09 |
| | 7 | 16 | 4 | 12 | Excellent | 99.8 | 0.09 |
| | 8 | 20 | 9 | 21 | Excellent | 97.1 | 0.12 |
| | 9 | 24 | 7 | 22 | Excellent | 96.9 | 0.09 |
| | 10 | 26 | 8 | 26 | Excellent | 97.8 | 0.11 |
| | 11 | 6 | 3 | 16 | Excellent | 99.8 | 0.09 |
| | 12 | 2 | 5 | 11 | Excellent | 98.7 | 0.12 |
| | 13 | 12 | 6 | 18 | Excellent | 99.1 | 0.14 |
| | 14 | 11 | 12 | 19 | Excellent | 95.1 | 0.13 |
| | 15 | 20 | 20 | 27 | Excellent | 88.9 | 0.14 |
| | 16 | 8 | 9 | 15 | Excellent | 98.4 | 0.13 |
| | 17 | 22 | 4 | 35 | Excellent | 93.5 | 0.22 |

TABLE 6

| | | Average particle diameter (μm) | Average film thickness (μm) | Maximum film thickness (μm) | Brazeability | Fin joining rate (%) | Maximum corrosion depth (mm) |
|---|---|---|---|---|---|---|---|
| Comparative Example | 1 | 4 | 4 | 12 | Excellent | 97.9 | 0.10 |
| | 2 | 10 | 1 | 15 | Excellent | 95.6 | 0.30 |
| | 3 | 12 | 5 | 20 | Fair | 96.0 | 0.14 |
| | 4 | 14 | 5 | 18 | Bad | 92.5 | 0.12 |
| | 5 | 36 | 4 | 20 | Fair | 88.1 | 0.13 |
| | 6 | 16 | 4 | 22 | Bad | 82.1 | 0.15 |
| | 7 | 10 | 6 | 18 | Fair | 95.1 | 0.11 |
| | 8 | 10 | 8 | 10 | Bad | 89.0 | 0.12 |
| | 9 | 8 | 7 | 11 | Bad | 84.0 | 0.10 |

INDUSTRIAL APPLICABILITY

An aluminum brazing composition containing a zinc-based flux (K—Zn—F-type zinc fluoride or the like) which improves the corrosion resistance after brazing must be stirred at the time of application, since the zinc-based flux having a large specific gravity precipitates during storage differing from a brazing composition containing an anticorrosive flux. Moreover, the precipitation phenomenon also occurs in a relatively short period of time until the brazing composition is applied to the aluminum material, whereby uniform application of the brazing composition is hindered.

The present invention prevents the precipitation of the zinc-based flux by providing an appropriate thixotropic viscosity to the brazing composition by adding a precipitation inhibitor consisting of a (meth)acrylic acid/(meth)acrylate copolymer emulsion to the brazing composition. This makes it unnecessary to stir the brazing composition at the time of application and enables the brazing composition to be uniformly applied to the aluminum material. Moreover, the precipitation inhibitor effectively functions in only a small amount of addition.

Since the (meth)acrylic acid/(meth)acrylate copolymer emulsion is used as the precipitation inhibitor in a specific amount instead of the other types of compounds used for a powder-containing paint, such as ultrafine particle silica, poly (meth)acrylate, or polyvinyl alcohol, the precipitation of the zinc-based flux can be prevented without impairing the brazeability.

There is a case in which it is common in the composition of the precipitation inhibitor in the present invention and the organic binder in the brazing composition. However, the average molecular weight of the copolymer which makes up the precipitation inhibitor is greater than that of the organic binder. This difference in the average molecular weight is the reason why a suitable thixotropic viscosity can be provided to the entire brazing composition.

The invention claimed is:

1. An aqueous aluminum brazing composition comprising a K—Zn—F-type zinc fluoride flux, an organic binder comprising a (meth)acrylate copolymer containing at least one carboxyl group-containing monomer, a (meth)acrylic acid/(meth)acrylate copolymer emulsion added as a precipitation inhibitor in an amount of 0.003-1.50 wt. %, based on 100 wt. % of the brazing composition, and an amino alcohol having a boiling point of 120-200° C. as a reaction inhibitor for inhibiting a reaction between zinc contained in the flux and a carboxyl group contained in the organic binder or the precipitation inhibitor, wherein the numerical value of the weight-average molecular weight of the copolymer in the emulsion used as the precipitation inhibitor is more than ten times greater than that of the copolymer of the organic binder and the brazing composition has a thixotropic index of 1.01-1.20.

2. The brazing composition according to claim 1, further comprising metal silicon powder as a brazing filler metal.

3. An aluminum material coated with a brazing composition which is produced by applying the brazing composition according to claim 1 to the aluminum material and drying the brazing composition, thereby causing a dried residual component in the brazing composition to adhere to a surface of the aluminum material.

4. The aluminum material according to claim 3, wherein an average thickness and a maximum thickness of a film of the brazing composition are respectively 2-15 μm and 30 μm or less.

5. The aluminum material according to claim 3, wherein an average particle diameter of the zinc-based flux is 30 μm or less.

6. An aluminum brazing method comprising assembling the aluminum material according to claim 3 into a specific structure, and heating the structure to a brazing temperature to form a zinc diffusion layer on the surface of the aluminum material.

* * * * *